March 10, 1953

J. R. SHERRY 2,630,985

HELICOPTER STABILIZER

Filed Dec. 7, 1950

INVENTOR
JAMES R. SHERRY
BY M. B. Tasker
ATTORNEY

March 10, 1953
J. R. SHERRY
2,630,985
HELICOPTER STABILIZER
Filed Dec. 7, 1950
2 SHEETS—SHEET 2
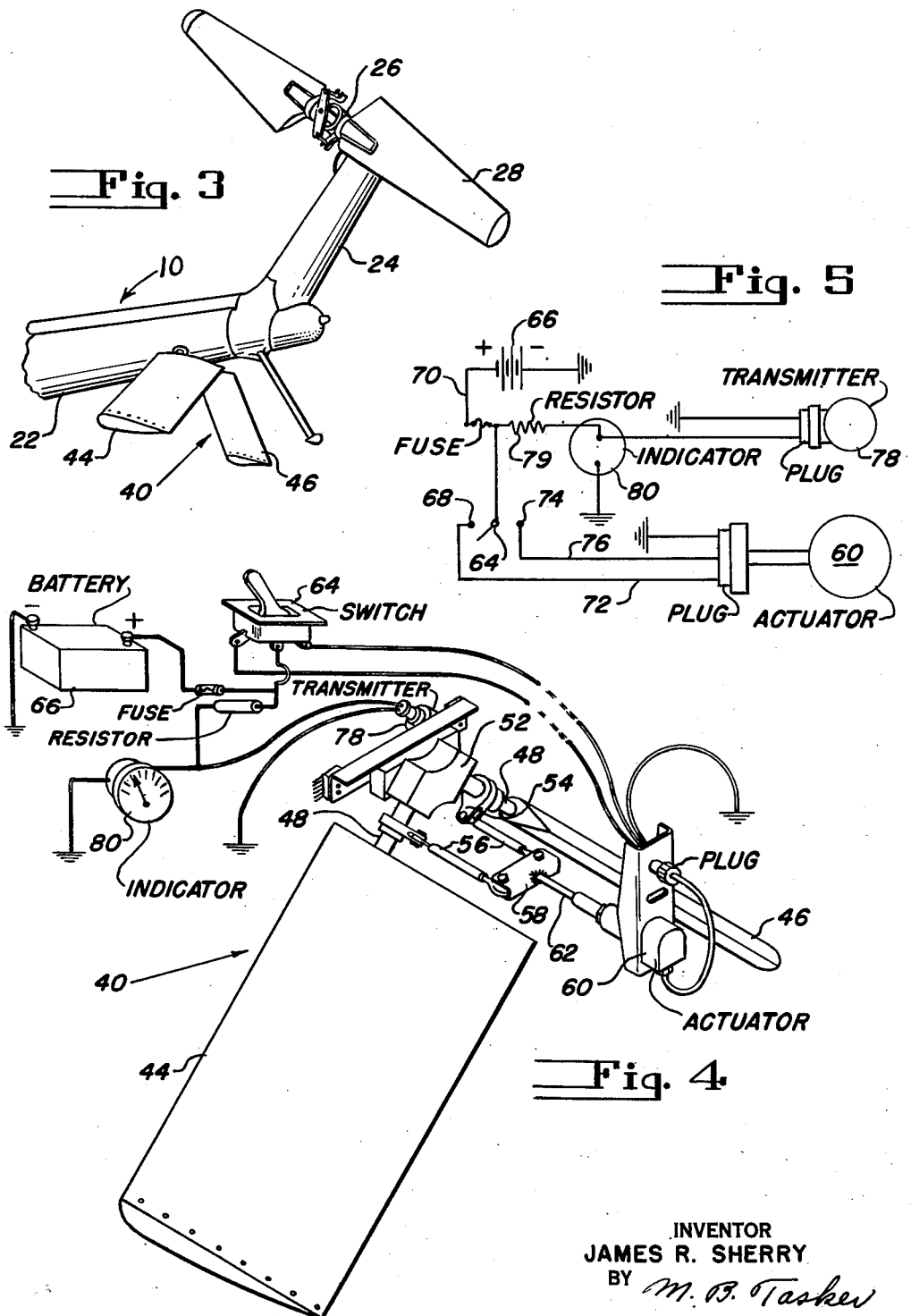
INVENTOR
JAMES R. SHERRY
BY M. B. Tasker
ATTORNEY Patented Mar. 10, 1953

2,630,985

UNITED STATES PATENT OFFICE 2,630,985

HELICOPTER STABILIZER

James R. Sherry, Bridgeport, Conn., assignor to United Aircraft Corporation, East Hartford, Conn., a corporation of Delaware Application December 7, 1950, Serial No. 199,626

2 Claims. (Cl. 244—17.19)

This invention relates to improvements in stabilizers for helicopters and is especially advantageous in helicopters of the type in which the lift is obtained by a single sustaining rotor, the torque of which is neutralized by a tail rotor mounted at the extremity of a tail cone, although the invention is applicable to other types of helicopters.

The usual vertical fin and horizontal stabilizer surfaces used to provide directional and longitudinal stability in airplanes may be both dangerous and inadequate in a helicopter of this type. The usual tail mounted vertical fin, if of sufficient area to be at all effective, is liable to be struck by the main rotor blades due to the small clearance between the tail cone and the tips of the blades. Also, such a vertical fin lies in the slipstream of the horizontal tail rotor. It has been proposed to mount the fin below and at the outboard extremity of the tail rotor cone but its effectiveness as a control surface is greatly reduced by the turbulent wake of the cabin and it interferes with the tail rotor slipstream. The action of a conventional horizontal stabilizer is interfered with seriously by the main rotor slipstream, particularly during hovering of the helicopter when a nose up condition may be produced. Its use also involves considerable difficulty in mounting it so that mechanical or aerodynamic interference with the tail rotor will be avoided.

It is an object of this invention to provide improved means for obtaining both directional and longitudinal stability in helicopters.

Another object of the invention is to provide a helicopter having an inverted V-tail.

Another object of the invention is to provide horizontal and vertical tail surface effects for a helicopter without the presence of conventional horizontal and vertical stabilizer and fin surfaces.

A yet further object of this invention is to provide improved tail surfaces for a helicopter which afford more damping when the tail of the helicopter is moving down than when the tail is moving up.

A further object of the invention is the provision of means for trimming the flight controls of a helicopter for variations in center of gravity location.

A further object of the invention is the provision of means for providing directional trim for helicopters.

A still further object is generally to improve the control and performance of helicopters.

These and other objects and advantages of the invention will be hereinafter pointed out in connection with the detailed example shown in the accompanying drawings.

In these drawings:

Fig. 3 is a detailed perspective view of the outboard end portion of the tail cone showing the tail rotor and the improved stabilzing surfaces.

Fig. 4 is an enlarged, somewhat diagrammatic, detailed view of the stabilizing surfaces and the controls therefor.

Fig. 5 is a wiring diagram of the control circuits.

Figure 1:
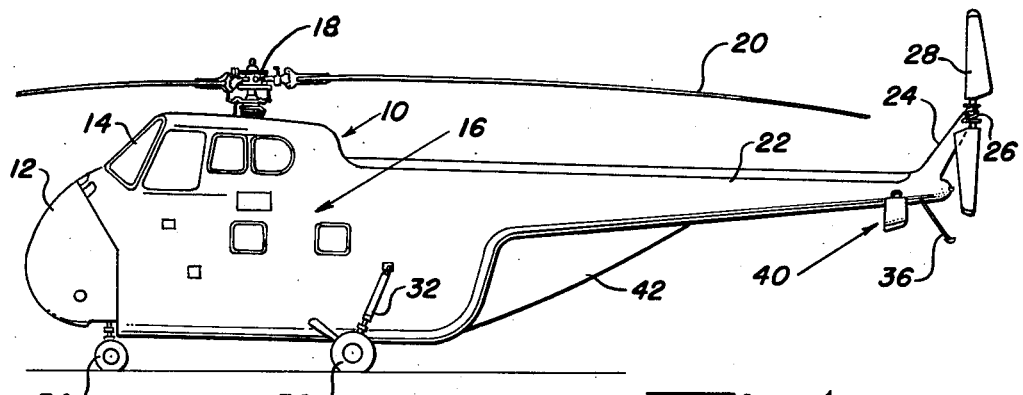
Fig. 1 is a side elevation of a helicopter having the improved stabilizer surfaces of this invention.

As herein shown, the helicopter has a body generally indicated at 10 which contains a forward engine compartment 12, an upper pilot compartment 14, and a cargo or passenger compartment 16. A main lifting rotor 18 is mounted for rotation about an upright axis in the body 10 and has articulated rotor blades 20.

The body 10 has a tail cone 22 projecting rearwardly therefrom and terminating in a pylon 24 which supports a tail rotor 26 rotatable about a transverse axis. The tail rotor has a variable pitch blades 28 which are controllable from the pilot's compartment in a usual manner to compensate for the main rotor torque and also to provide for directional control of the helicopter.

Figure 2:
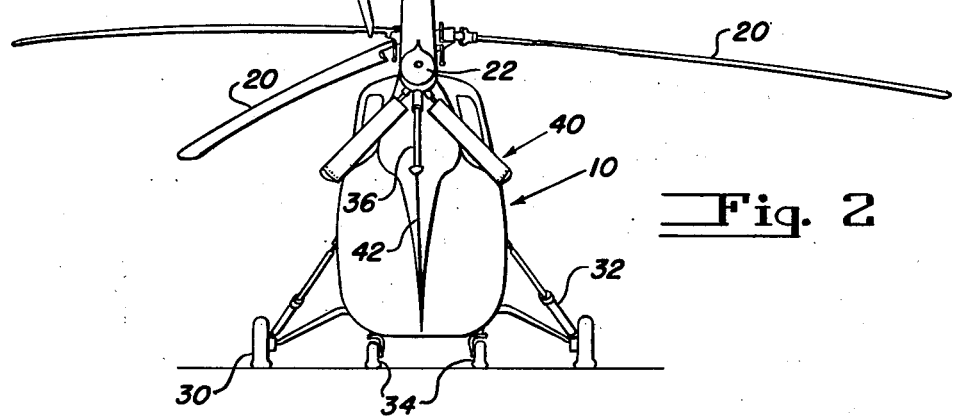
Fig. 2 is an end view of the helicopter of Fig. 1 looking toward the outboard extremity of the tail rotor cone.

The helicopter is supported on main landing gear 30 provided with the usual oleo struts 32 and on a pair of forward nose wheels 34 (Fig. 2). A depending skid 36 is provided at the extremity of the tail cone to protect the tail rotor and also the stabilizing surfaces generally indicated at 40 in case of a tail down landing. Furthermore when the aircraft is mounted on floats for water landing the surfaces 40 will act as planing surfaces and protect the tail rotor when the tail skid 36 would not be effective. A fairing 42 is provided under the tail cone 22 closely adjacent to and faired into the body 10 and into the adjacent portion of the cone 22. By this arrangement of the fairing 42 the body 10 is better streamlined and its turbulent wake is minimized, making possible a smaller area of the stabilizing surfaces.

In accordance with this invention both longitudinal and directional, and to a great extent, the vertical stability of the helicopter is provided by the inverted V-tail 40, which comprises two oblique airfoil surfaces 44 and 46 extending downwardly and outwardly from the tail cone 22 adjacent the outboard extremity of the latter. As shown most clearly in Fig. 4, the surfaces 44 and 46 have spars 48 which comprise the pitch changing axes of the blades and are rotatably mounted in suitable fixed structure 52 on the helicopter tail cone. Each surface 44, 46 has a horn 54 fixed to its spar 48 and the extremities of these two horns are connected by thrust links 56 to a yoke 58 reciprocated by an actuator 60 of a well-known type consisting of a reversible electric motor which reciprocates a thrust member 62 fixed to yoke 58 in response to opposite rotations of the motor. The energization of the motor 60 in one or the other direction of rotation is controlled by a pilot operated switch 64 located in the pilot's compartment.

Although the instant application shows the more refined method of adjusting the angle of incidence of the stabilizer surfaces 44, 46 by slave units, herein electric motors, controllable by the pilot flight, it can readily be seen that for a more economical installation omitting remote controlled power units, the device is equally adapted to ground adjustment by varying the length of links 56.

In Fig. 5, the circuit for electric motor 60 is shown which includes a battery 66 as a source of energy. When the pilot throws switch 64 into engagement with contact 68, current will flow from the battery through conductor 70, switch 64, contact 68 and conductor 72 to the motor 60, effecting operation of the latter in one direction to move the surfaces 44 and 46 in unison about their pitch changing axes. Moving the switch 64 into engagement with contact 74 will cause current to flow through conductor 70, switch 64, contact 74 and conductor 76 to motor 60, resulting in the reverse rotation of the motor and the movement of the surfaces 44, 46 in the opposite direction about their pitch changing axes. Transmitter 78 is located adjacent the pivoted ends of spars 48 of said stabilizing surfaces and movement of said surfaces in either direction will cause the position of the surfaces to be indicated on indicator 80 located in the pilot's compartment, the power for operating the indicator and the transmitter being obtained from the battery 66 as is shown in Fig. 5.

As herein shown, the indicator 80 is supplied with current from battery 66 through a high resistance resistor 79. Transmitter 78 is connected to ground in parallel with indicator 80 and may comprise a variable resistor. As the resistance of transmitter 78 is increased or decreased upon movement of surfaces 44, 46 in opposite directions, the current flowing in resistor 79 is correspondingly varied and these variations in current will be shown on indicator 80 to indicate the position of the surfaces 44, 46 on either side of a neutral position.

Figure 6:
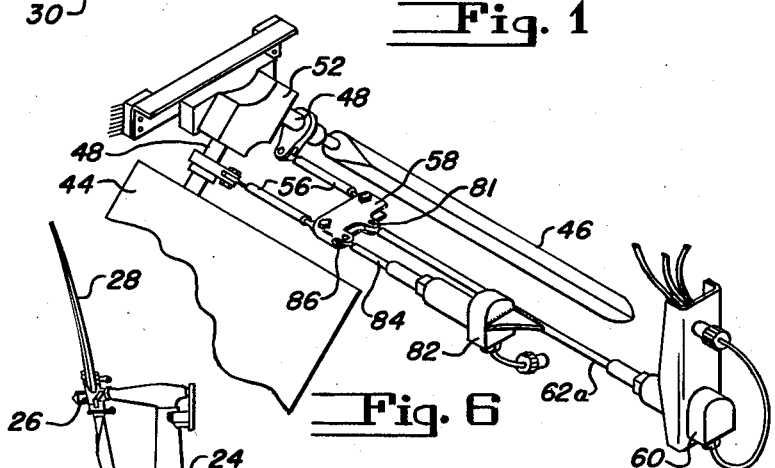
Fig. 6 is a view similar to Fig. 4 showing additional control means for providing either like or opposite movements of the surfaces.

In Fig. 6, in addition to the control provided in Fig. 4, an additional actuator has been provided for moving the surfaces 44, 46 oppositely. In this modification the thrust member 62 is elongated to provide a member 62a which is pivotally connected to yoke 58 at 81. Member 62a carries a second actuator 82 which reciprocates a thrust member 84 having a pivotal connection to yoke 58 at 86.

When actuator 60 is energized the yoke 58 and thrust links 56 will be moved bodily to move surfaces 44, 46 similarly; while energization of actuator 82 will result in pivotal movement of yoke 58 about point 81 causing surfaces 44, 46 to move oppositely.

It will be evident that as a result of the V-stabilizer 40 above described both horizontal and vertical surface effects will be produced when the helicopter has a horizontal component of flight. It will further be evident that because of the downwardly and outwardly directed position of surfaces 44 and 46 these surfaces are not adversely affected by the downwardly moving slipstream from the main rotor blades 20 in hovering, particularly since these surfaces are located just outside the projected disc area of the main rotor blades. In forward flight the main rotor down-wash is considerably reduced in velocity and may be considered as negligible in view of the large component of forward velocity. The surfaces 44 and 46 are also below the transversely moving slipstream of the tail rotor and thus do not adversely affect the tail rotor nor are they affected by it. Also, because of their downward inclination, it is possible to locate surfaces 44 and 46 outboard of the main rotor slipstream and below the tail rotor slipstream and out of the tip path plane of the tail and main rotors. Because of the downward inclination the effective vertical area of the stabilizers is away from the turbulent disturbance of the tail cone or body portion in forward flight and thereby a substantial pitching and yawing stabilization can be obtained therefrom.

A further advantage of the inverted V-stabilizer disclosed herein resides in the fact that substantial damping effects are provided upon a sudden nose up maneuver of the helicopter, which is a critical condition in helicopter operation, while a nose down maneuver is possible with materially less damping effect.

Also as a result of the new stabilizing surfaces it is possible to trim the flight controls of the helicopter for variations in center of gravity location as well as to provide directional trim.

While only a single embodiment of the invention has been shown and described herein, it will be evident to those skilled in the art that various changes in the construction and arrangement of the parts may be resorted to without departing from the scope of the invention.

I claim:

1. In a helicopter having a body and a sustaining rotor mounted on said body, a combined horizontal and vertical stabilizer mounted on said body, said stabilizer including airfoil surfaces extending oppositely downwardly and outwardly from said body at a location on the latter which is outside the projected disc area of the sustaining rotor, said surfaces being supported on spar members which project beneath said body sufficiently to position said surfaces substantially completely outside both the horizontally and vertically projected areas of said body.

2. In a helicopter having a body including a tail cone, a main lifting rotor rotatable about an upright axis and a tail rotor rotatable about a generally horizontal axis, a combined horizontal and vertical stabilizer, said stabilizer including two airfoil surfaces extending oppositely downwardly and outwardly from beneath said tail cone at a location on the latter which is outside the projected disc area of the lifting rotor and below the transversely moving slipstream of said tail rotor.

JAMES R. SHERRY.

REFERENCES CITED

The following references are of record in the file of this patent:

UNITED STATES PATENTS

| Number | Name | Date |
|---|---|---|
| D. 154,973 | Alex | Aug. 30, 1949 |
| 1,385,784 | Hall | July 26, 1921 |
| 1,836,681 | Palmquist | Dec. 15, 1931 |
| 2,120,717 | Sikorsky | June 14, 1938 |
| 2,225,002 | Flocke | Dec. 17, 1940 |
| 2,415,622 | Bossi | Feb. 11, 1947 |
| 2,424,882 | Gluhareff | July 29, 1947 |

FOREIGN PATENTS

| Number | Country | Date |
|---|---|---|
| 425,645 | Great Britain | Mar. 19, 1935 |
| 576,120 | Great Britain | Mar. 20, 1946 |